United States Patent [19]

George et al.

[11] 4,326,848
[45] Apr. 27, 1982

[54] CONSTANT BELT TENSION DEVICE

[75] Inventors: Larry T. George, Greenfield; Herbert W. Egan, Jr., Indianapolis, both of Ind.

[73] Assignee: Wallace Murray Corporation, New York, N.Y.

[21] Appl. No.: 142,434

[22] Filed: Apr. 21, 1980

[51] Int. Cl.³ .............................................. F16H 7/12
[52] U.S. Cl. ..................................... 474/135; 74/470; 188/371; 267/153; 403/225
[58] Field of Search ............. 267/63 R, 63 A, 57.1 R, 267/57.1 A, 141.1, 141.3, 141.7, 153; 474/135, 117, 138; 188/1 B; 74/470; 403/225, 226, 227

[56] References Cited

U.S. PATENT DOCUMENTS

| | | | |
|---|---|---|---|
| 2,179,959 | 11/1939 | Schroedter | 267/63 R |
| 2,189,870 | 2/1940 | Sluyter | 267/63 R |
| 2,538,955 | 1/1951 | Efromson et al. | 267/140.3 |
| 2,609,194 | 9/1952 | Krotz | 267/63 A |
| 2,716,566 | 8/1955 | Thiry | 267/153 |
| 2,819,060 | 1/1958 | Neidhart | 267/153 |
| 3,583,530 | 6/1971 | De Venne | 188/1 B |

FOREIGN PATENT DOCUMENTS 2430704 1/1976 Fed. Rep. of Germany ...... 474/135
1424744 2/1976 United Kingdom .

Primary Examiner—C. J. Husar
Assistant Examiner—Conrad Berman
Attorney, Agent, or Firm—Thomas J. Greer, Jr.

[57] ABSTRACT

A constant-tension spring device for the accessory belt of an automobile engine. The device includes a cylinder having an elastomer ring mounted within each of its ends. A rod passes through each elastomer ring, the rod having spaced shoulders each bearing against one end of a respective elastomer ring. Abutments within the cylinder position and retain the elastomer rings. Upon sufficient axial motion between the rod and cylinder, the elastomer rings are distorted by twisting and display a flat segment of the load vs. deflection curve between the rod and cylinder. The spring device maintains a desired tension within the accessory belt, compensating for temperature, humidity, and ageing changes in belt length which would otherwise result in change of belt tension.

5 Claims, 7 Drawing Figures

CONSTANT BELT TENSION DEVICE

This invention relates to a constant-tension spring device whose prime utility is maintaining a desired, predetermined tension within the accessory belt of an automobile engine. The invention however is not limited to this particular use, but may be employed as a constant-load spring device in any environment for maintaining a constant force over a limited range of movement. One example of this more general utility resides in pipe supports, such as those in large electrical power generating stations, wherein a constant lifting force on a pipe is desired.

In a modern automobile engine the crankshaft drives, typically (1) a pump for operating power steering, (2) the alternator or generator (3) an air conditioning compressor and (4) a water pump. In some installations, a single belt is threaded around several pulleys, each pulley being attached to a respective accessory such as one of those mentioned. Automotive designers find it convenient to fix the tension within the belt, it being desirable that this tension be maintained at all times. Should the tension decrease, slippage between the belt and the various pulleys would increase and belt wear might increase. Similarly, should the belt tension become greater, then wear of bearings on the accessory devices may increase. Changes in the length of the belt due to changes in temperature, humidity, and ageing, with resultant tension changes, have resulted in a search for methods or devices to maintain the desired belt tension. While a variety of such devices is known in the art, many have proven unsatisfactory for one reason or another.

One prime difficulty in maintaining tension on an accessory belt may be traced to the behavior of elastic substances. Most elastic substances, such as an elastomer, a coil spring, or the like, exhibit a behavior which is known as Hooke's law. This law states that the restoring force which a deformed, resilient element exerts is proportional to the deformation (displacement) of the resilient element. Thus, if a coil spring is compressed one inch, the force of compression will be a fixed proportion of that which is required to compress it two inches. An elastic element, in general, therefore exhibits a force vs. displacement behavior not suited for a constant tension device. In the past, workers have often had recourse to lever systems and the like to yield a constant or nearly constant spring force.

According to the practice of this invention, a constant force or constant-tension spring device may be constructed by the use of a special arrangement of one or more elastomer rings in combination with a rod and cylinder. Each elastomer ring is positioned within a cylinder. A ledge abutment fixes the normal position of the ring in the cylinder. A rod passes through the ring, the rod carrying a shoulder which abuts the ring. The device is so constructed that movement of the rod relative to the cylinder will tend to twist the ring about its circular axis. The circular or toroidal axis of the elastomer ring is an axis 360° in angular extent, lying in a plane orthogonal to the rod axis, and is positioned within the elastomer. Continued rod movement, beyond a critical point will cause a flat response along a portion of the load vs. deflection curve. The spring device of this invention is operated at a displacement between the rod and the cylinder which corresponds to the flattened segment of the load-deflection curve.

Spring devices are known which employ elastomer ring or toroidal elements. For example, U.S. Pat. No. 2,819,060 issued to Neidhart employs elastomer toroids or rings in combination with rigid, conical members. Other examples of this type of spring device are afforded by U.S. Pat. No. 2,179,959 issued to Schroidter, U.S. Pat. No. 2,189,870 issued to Sluyter, and U.S. Pat. No. 2,538,955 issued to Efromson. Upon impressing a load, the elastomer elements are deformed, also undergoing rolling or twisting about their lengthwise, toroidal axes. However, the main force on the elastomer ring elements is one of compression, with lesser forces due to shear and torsion or twisting. In the present invention, in distinction, the main force on the elastic toroids is one of torsion, with lesser forces of compression and shear. Further, an even greater difference is that Neidhart and others fail to show or suggest a specific arrangement, or a specific method, wherein the spring device may be operated to yield a constant restoring (elastic) force over at least a limited range of displacement.

In the art of resilient mountings, it is known to construct an elastic support device which includes inner and outer cylinders (corresponding to the outer cylinder and inner rod of this invention) and an elastomer ring or toroid positioned between them. One example of this known type of rubber mounting or rubber joint is shown in U.S. Pat. No. 2,716,566 issued to Thiry. However, such devices are not operated on a flat segment of the load-deflection curve of inner vs. outer cylinder movement. This is apparently because the inventors of such prior art joints have failed to realize that there exists a critical point in relative motion between the inner and outer cylinder beyond which, for at least a limited range, a flat response exists and can be used as a constant tension device. Further, many such resilient mountings of the Thiry type require substantial predistortion of precompression of the elastomer member between the inner and outer cylinders upon assembly and prior to loading.

IN THE DRAWINGS

Figure 1:
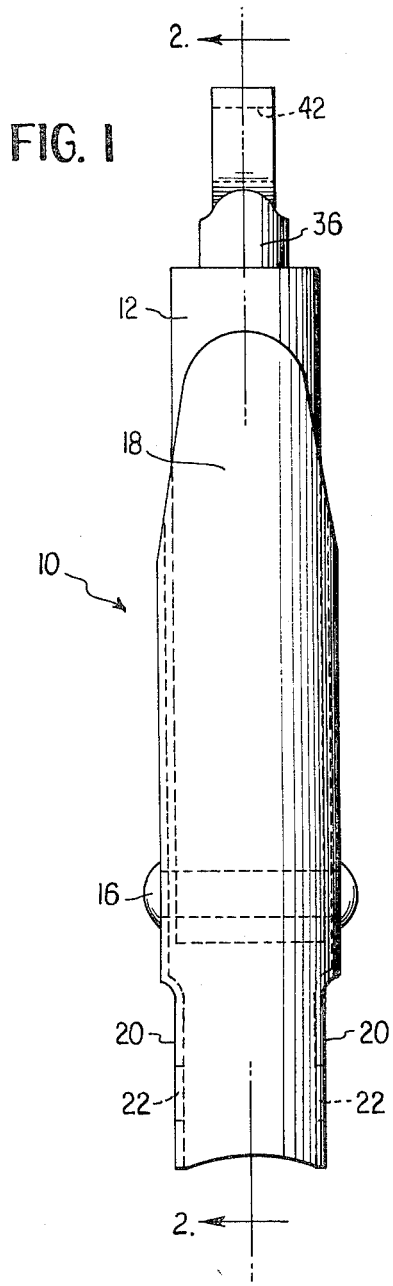
FIG. 1 is a plan view of a constant-tension spring device according to this invention.

Referring now to the drawings, the numeral 10 denotes generally the constant-tension device of this invention and includes a right circular cylinder housing 12 having a continuous, annular internal ledge support 14 positioned inwardly of the cylinder ends. The numeral 16 denotes a pivot pin which passes through the lower end of cylinder 12 and through complementary apertures in the sides 20 of U-shaped locking lever 18. Sides 20 are also provided with aligned apertures 22 for securement to a support within the engine compartment of an automotive vehicle. The sides of lever 18 may be tapered as indicated by the numeral 24. The numeral 30 denotes a rod having a lower portion 32 of reduced diameter, portions 30 and 32 being integrally joined in the region of shoulder abutment 34 on the lower end of rod 30. The upper portion of rod 30 carries an enlargement 36, the two portions being integrally joined at shoulder abutment 40 which is the lower portion of enlargement 36. An aperture 42 is provided in enlargement 36 for attachment to a part of the engine mounting compartment.

The numerals 46 and 48 designate, respectively, upper and lower elastomer ring elements which may also be described as elastomer annular elements. The lower portions of these elements rest on internal ledge abutments 14, with rod 30 passing through a central aperture in upper elastomer ring 46 and rod portion 32 passing through a corresponding central aperture in elastomer ring 48. Shoulder abutments 40 and 34 contact, respectively, rings 46 and 48. The elastomer rings are not bonded to the internal surface of cylinder 12.

Figure 2:
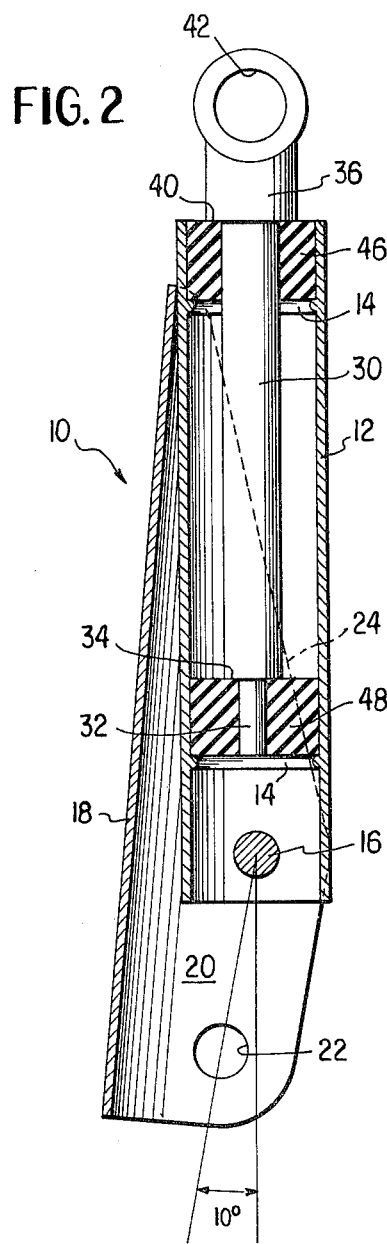
FIG. 2 is a view taken along section 2—2 of FIG. 1.
Figure 4:
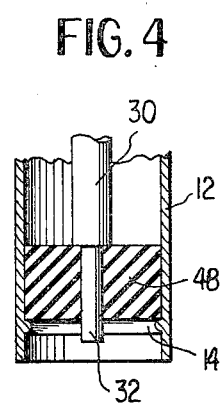
FIGS. 4, 5 and 6 are partial views of the cylinder, elastomer rings and rod of FIG. 2 and illustrate the rolling or twisting displacement undergone by an elastomer ring, here the lower elastic ring, about its toroidal or longitudinal axis, with continued motion of the rod relative to the cylinder.
Figure 5:
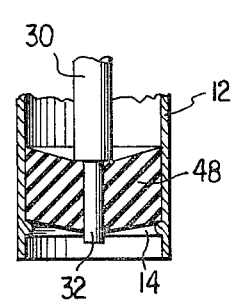
Figure 6:
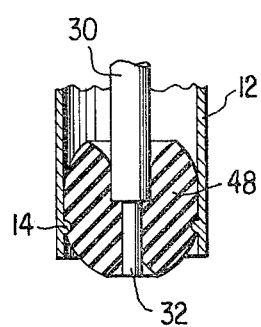
Figure 3:
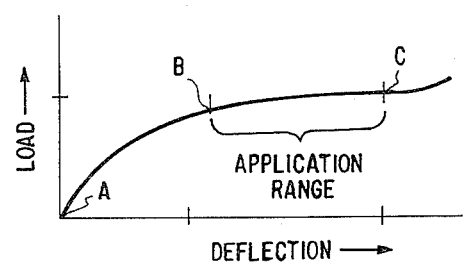
FIG. 3 is a load vs. deflection curve for the spring device of FIGS. 1 and 2.

Reference now to FIG. 3 of the drawings, taken in combination with FIGS. 4, 5 and 6, will illustrate the invention by showing its operation as rod 30 is moved downwardly relative to cylinder 12 as viewed in FIG. 2. The action for ring 46 is the same as that of ring 48. The segment AB of FIG. 3 shows a behavior similar to that which would be expected by the application of Hooke's law upon such relative movement. Namely, with increasing load, the resultant deflection (downward motion of rod 30 with respect to cylinder 12) would increase in a fairly linear manner. Namely, the greater the deflection, the greater the elastomer load force. FIG. 5 of the drawings illustrates the configuration of the lower elastomer ring 48 at a point corresponding to point B at FIG. 3. Thus, in moving from the normal or rest position of FIG. 4 to the distorted position of FIG. 5, on account of downward motion of rod 30 with respect to cylinder 12, the relation between the elastomer load force and the deflection of rod 30 is shown by segment AB.

Further movement of rod 30 with respect to cylinder 12 will result in further distortion of elastomer ring 48. The ring will continue its motion, the motion being a combination of downward movement and twisting or rotating about its circular axis. During such further motion, ledge 14 will maintain the lower portion of ring 48 at the position shown at FIG. 2. The distortion illustrated at FIG. 6 is thus the result of rolling of the ring and a limited amount of sliding relative to cylinder 12. The main force exerted by shoulder 34 on ring 48 is one of torsion, with lesser forces due to compression and shear of the elastomer.

The reader will observe that segment BC of FIG. 3 is the range of application or operation of the device shown at FIGS. 1 and 2 of the drawings. Namely, between points B and C the force exerted by the elastomer elements 46 and 48 on the rod 30, urging the rod back towards the position shown at FIG. 2 of the drawings, is substantially independent of the displacement of rod 30 relative to cylinder 12. The load vs. deflection curve is substantially flat in region BC. Beyond point C on the curve of FIG. 3, continued downward motion of rod 30 relative to cylinder 12 would result in still further deformation of the elastomer ring elements, and the curve of FIG. 3 displays an increased slope beyond this point. That the behavior illustrated at the segment BC of FIG. 3 is desirable in an actual automotive installation may now be seen with reference to FIG. 7 of the drawings.

The constant load device 10 of this invention is schematically indicated, with one end being fixed to a frame member in the engine and the other being affixed to a pivoted bracket upon which is mounted the alternator. The reader will now be in a position to see that with a desired belt tension, for example, of 120 pounds, then either a lessening or a lengthening of the belt, such as occasioned by changes in ageing, temperature, humidity, etc. would ordinarily result in a variance from the desired tension value. By the practice of this invention, however, any (1) increase in belt length, which would ordinarily cause a lessening of tension, will be compensated for by movement of the constant tension device 10 and such additional movement, being in the range BC, will not result in a change in the force exerted on the belt by the tensin device 10 and (2) any decrease in the length of the belt which would cause a movement of the tension device 10 within the range BC will likewise not result in a change in belt tension.

The rolling or twisting deformation of elastomer rings 46, 48 is due to their manner of placement in cylinder 12, together with the location of shoulder abutments 34, 40. In order that the elastomer rings may twist, it is necessary that the minimum diameter of the ledge supports 14 be greater than the maximum diameter of the abutment shoulders 40, 34. Further, the corresponding ledge supports 14 and the shoulders 34, 40 must be, for each elastomer ring, axially spaced from each other. Still further, the elastomer rings must not be bonded to cylinder 12, to thereby permit the twisting or rolling action shown at FIGS. 4 and 5. In the normal or unloaded position, shown at FIG. 2, the elastomer rings are substantially uncompressed or undistorted.

In constructing the constant tension device of this invention, a variety of elastomers may be employed. The specific type of elastomer, the specific dimensions of the device, and the like, will depend on the particular belt application. Trial, on a test stand or the like, will establish the critical point B which commences the segment BC on the load-deflection curve. The mid point of the segment BC may be selected as the normal point of operation, to thus yield constant force upon both belt shrinkage and lengthening. Thus, the device is initially compressed, in an actual installation, such as shown on FIG. 7, so that operation commences on a part of the flat segment BC of FIG. 3.

Figure 7:
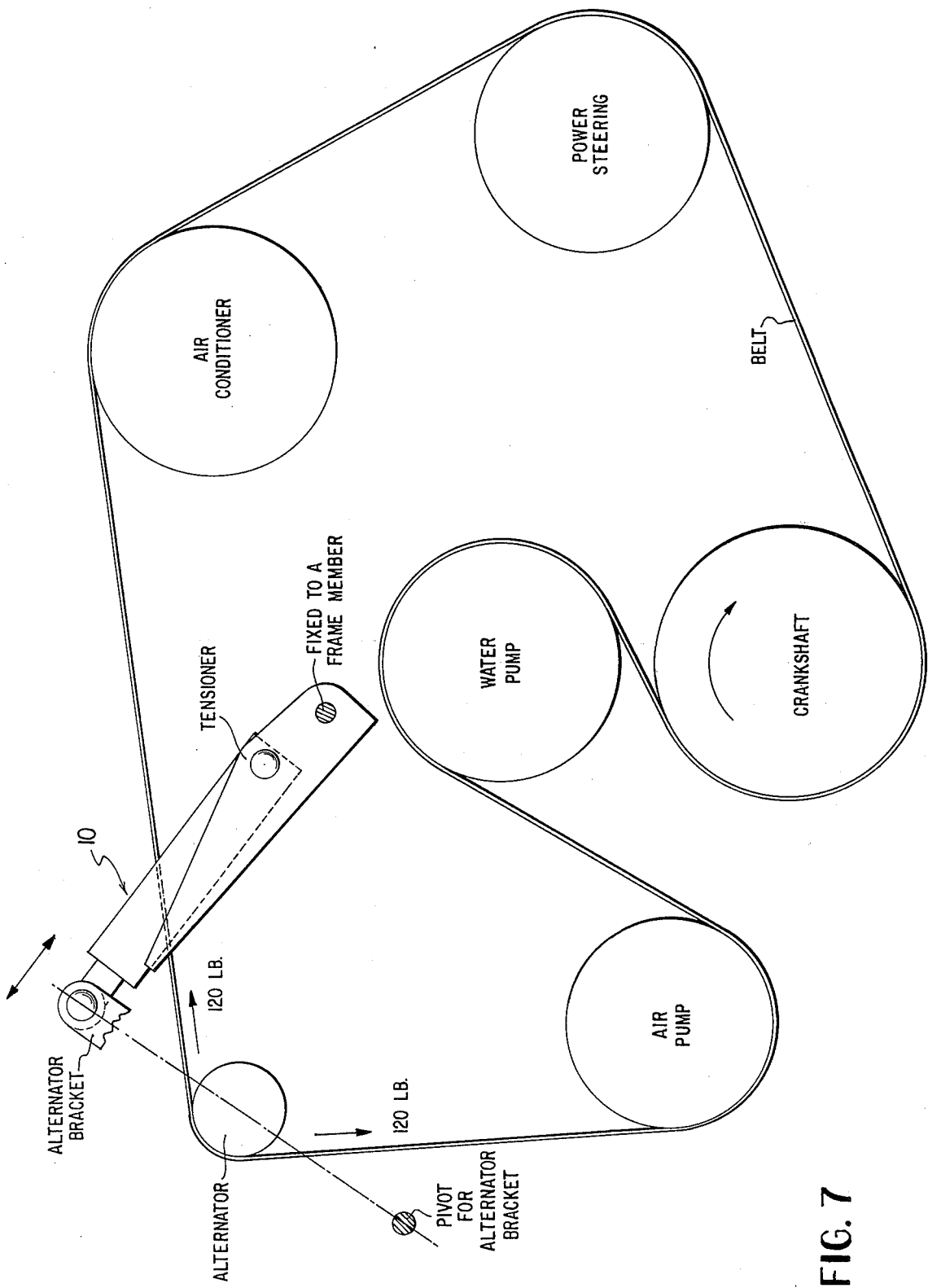
FIG. 7 is a partially schematic view and illustrates the use of the constant-tension device of this invention in an automobile engine wherein the crankshaft is coupled to a number of accessory devices by means of a single flexible belt.

In one embodiment of the invention, the cylinder 12 was approximately five inches in length, one inch in diameter and of sheet metal. The distance from points 16 to 22 about 1.3 inches, and points 42, 16 and 22 related to yield a toggle or snap action, as shown at FIG. 2. The elastomer rings were about one-half inch in thickness. When installed in an engine, as indicated at FIG. 7, the tensioner 10 has its elastomer rings distorted as shown at FIG. 6 and initially operates at the mid point of the flat part of its load-deflection curve. The tensioner places force on the belt through a pivoted alternator bracket as shown. The view of the tensioner 10 shown at FIG. 2 is of course in its undistorted, uninstalled condition, yet illustrates the toggle action.

What is claimed:

1. A method of operating a spring device to achieve constant force over at least a limited range of deflection, the spring device defined by a cylindrical housing carrying at least one elastomer ring therein, the housing having an internal ledge abutment for maintaining the outer periphery of an end of said ring fixed relative to said housing against forces in one direction, a load carrying rod having a shoulder abutting the inner periphery of the other end of said elastomer ring, the diameter of the said internal ledge abutment being greater than the diameter of the said abutting shoulder of the rod, the method including the steps of (1) forcing the rod against the elastomer ring, to thereby urge the elastomer ring against the ledge abutment, to thereby cause the elastomer ring to undergo distortion, the load vs. deflection curve at least initially generally following Hooke's law (2) continuing such force until a region of the load vs. deflection curve is reached which is substantially flat, at which region the load is substantially independent of deflection, the elastomer ring undergoing torsion around its circular axis (3) operating the spring device in the said substantially flat region thereof, whereby the spring device may be used to bear against an accessory belt in an internal combustion engine to maintain a desired tension therein, substantially independent of accessory belt length changes as occasioned by changes in temperature, humidity, and ageing.

2. A constant-tension spring device for the accessory belt of an automobile engine, the device including, a cylindrical housing having at least one annular elastomer ring member positioned therein, the outermost sides of said elastomer ring being in contact with an inner surface portion of said cylinder, the housing having an internal ledge abutment constantly contacting said elastomer ring to maintain the outer periphery of one end face of said ring fixed with respect to said cylinder against forces in one direction, a load carrying rod having a shoulder which constantly bears against the inner periphery of the other end face of said elastomer ring, the said rod shoulder being of lesser diameter than said ledge abutment, the improvement comprising, the elastomer ring being substantially uncompressed in its normal, unloaded configuration, the sides of the ring being unbonded to thereby permit the ring sides to move away from the interior surface of the cylindrical housing, whereby movement of the rod shoulder towards the abutment causes the elastomer ring to undergo torsion about its circular axis, to thereby result in a flat segment over a portion of the load vs. deflection curve of the device, whereby the device may be operated along the flat segment of the load vs. deflection curve, to cause an accessory belt of an automotive engine to have a constant tension to compensate for changes in belt length due to temperature, ageing, and humidity.

3. The spring device of claim 2 wherein said shoulder is integral with said rod.

4. The spring device of claim 2 including a second elastomer ring positioned in said cylindrical housing and axially spaced from the first mentioned elastomer ring, and similarly positioned in the housing by a similar, second ledge abutment, the said rod carrying a second shoulder also of lesser diameter than its corresponding abutment ledge, the said second elastomer ring and shoulder related in the same manner as the first and operating in the same manner.

5. The spring device of claim 4 wherein said two shoulders are integral with said rods and are defined by rod segments of progressively reduced diameter.

* * * * *